M. A. ROBINSON.
MOTOR CAR FENDER.
APPLICATION FILED AUG. 9, 1920.

1,378,423.

Patented May 17, 1921.

Inventor,
M. A. Robinson
By E. J. Fetherstonhaugh
Atty.

UNITED STATES PATENT OFFICE.

MARK ALEXANDER ROBINSON, OF TORONTO, ONTARIO, CANADA.

MOTOR-CAR FENDER.

1,378,423.  Specification of Letters Patent.  Patented May 17, 1921.

Application filed August 9, 1920. Serial No. 402,373.

*To all whom it may concern:*

Be it known that I, MARK ALEXANDER ROBINSON, a subject of the King of Great Britain, and resident of 7 Charles Street west, in the city of Toronto, in the county of York, in the Province of Ontario, in the Dominion of Canada, have invented certain new and useful Improvements in Motor-Car Fenders, of which the following is a specification.

The invention relates to improvements in motor car fenders as described in the present specification and shown in the accompanying drawings that form a part of the same.

The objects of the invention are to provide a fender by the employment of which objects coming in contact therewith will be picked up thereby, thus eliminating the possibility of fatal accidents, and generally to provide a motor car fender which will be inexpensive of construction, simple of adjustment, durable and efficient.

In the drawings, Figure 1 is a perspective view of a portion of a vehicle showing a fender in position, a portion of the resilient covering being broken away.

Like numerals of reference indicate corresponding parts in the various figures.

Figure 1:
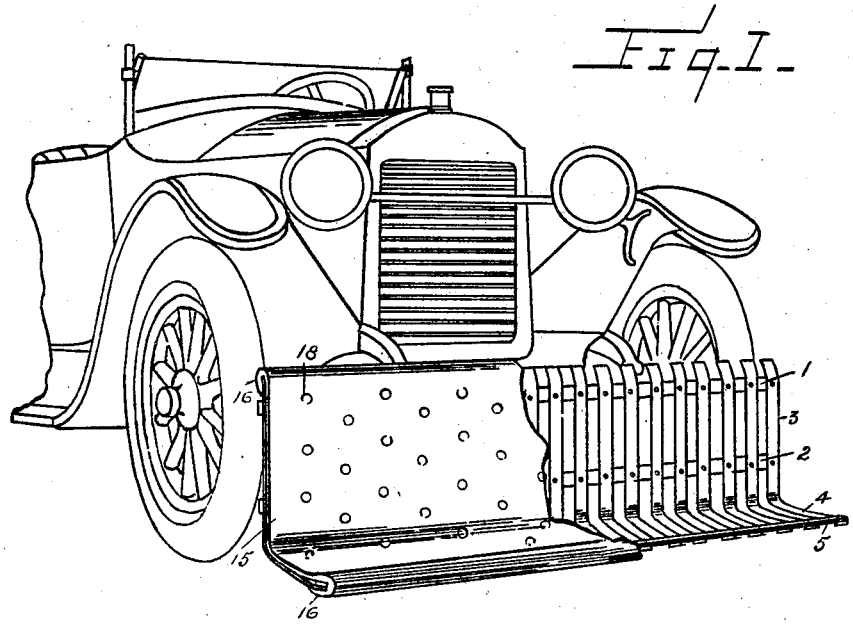
Figure 2:
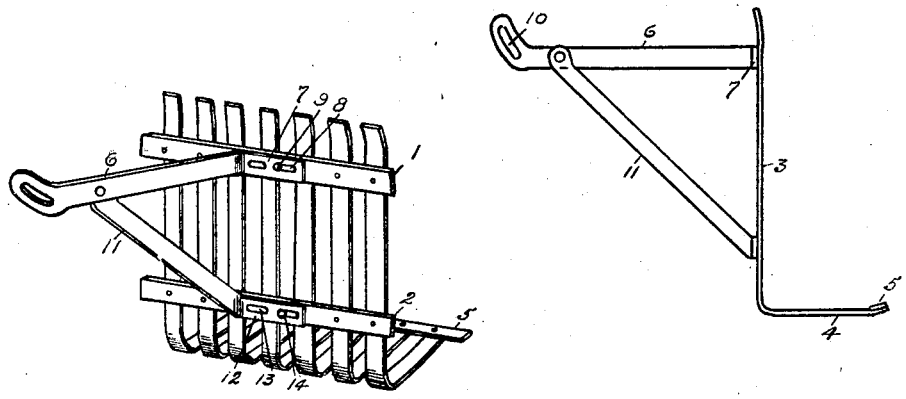
Fig. 2 is a rear perspective view of a portion of a fender.
Figure 3:
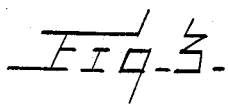
Fig. 3 is an end view of the fender frame.

Referring to the drawings, 1 and 2 are bars of sufficient length to extend completely across the front of a motor car and forming the main frame by which the various other parts are supported.

3 are slats secured in vertical arrangement transversely of the bars 1 and 2 and adjacent to their lower ends being turned outwardly at right angles as at 4 and connected together by means of a strap 5, said slats forming a cradle adapted to be supported with the horizontal portion located just above the ground so that a body or other object coming in contact therewith will be lifted from the ground and carried along without fear of being run over by the wheels of the vehicle.

6 are metal bars of which there are preferably two in number, one located adjacent to each end of the fender, said bars being bent at right angles as at 7 and provided with slots 8 adapted to receive suitable fastening pins 9 from the bar 1 to provide for adjusting said bars 6 in longitudinal relation to said transverse bars 1 to permit of securing the device to cars of varying widths, said bars 6 at their other ends being suitably curved and slotted as at 10 for securing to a motor car frame.

11 are brace members secured to the bars 6 respectively adjacent to their free ends and extending downwardly and terminating in right angle portions 12 provided with slots 13 adapted to receive fastening pins 14 from the transverse bar 2.

15 is a pad preferably constructed of rubber and adapted to completely cover the fender and having its edges curled as at 16 to firmly grip the edges of the fender, said pad being provided throughout its surface with resilient bosses 18 for the purpose of minimizing the force of impact.

In the use of the invention the bars 6 are adjusted in longitudinal relation to the bars 1 and 2 according to the width of the vehicle and are secured to the vehicle frame with the fender suspended slightly above the ground so that upon coming in contact with any object said object will be raised from the ground and deposited on the resilient face of the fender.

What I claim is:

A motor car fender comprising spaced vertically arranged pieces having their lower ends turned outwardly forming a supporting member, transverse pieces connecting said vertical pieces, supporting brackets comprising slotted bars adjustably secured to the uppermost of said connecting pieces adjacent opposite ends thereof and projecting rearwardly at right angles thereto and adapted for adjustable connection with a vehicle and slotted bars adjustably secured to the lowermost of said connecting pieces and to the first mentioned bars, and an impact receiving pad having resilient projections forming a facing therefor.

Signed at the city of Toronto, this 14th day of July, 1920.

MARK ALEXANDER ROBINSON.

Witnesses:
W. G. HAMMOND,
M. HAMMOND.